United States Patent
Chung et al.

(10) Patent No.: US 8,845,989 B2
(45) Date of Patent: Sep. 30, 2014

(54) METHOD OF FIXING CARBON DIOXIDE

(75) Inventors: Sung Yeup Chung, Seoul (KR); Ki Chun Lee, Seoul (KR); Min Ho Cho, Gyeonggi-do (KR); Seok Gyu Sonh, Gyeonggi-do (KR); Dong Cheol Park, Incheon (KR)

(73) Assignees: Hyundai Motor Company, Seoul (KR); Kia Motors Company, Seoul (KR); Hyundai Steel Company, Incheon (KR)

(*) Notice: Subject to any disclaimer, the term of this patent is extended or adjusted under 35 U.S.C. 154(b) by 710 days.

(21) Appl. No.: 13/080,961

(22) Filed: Apr. 6, 2011

(65) Prior Publication Data

US 2012/0134902 A1    May 31, 2012

(30) Foreign Application Priority Data

Nov. 30, 2010  (KR) .................. 10-2010-0120925

(51) Int. Cl.
| | |
|---|---|
| *B01D 53/62* | (2006.01) |
| *B01D 53/80* | (2006.01) |
| *B01D 53/14* | (2006.01) |
| *C22B 7/04* | (2006.01) |
| *C04B 5/06* | (2006.01) |
| *C01B 31/24* | (2006.01) |
| *C01F 11/18* | (2006.01) |
| *C21B 3/06* | (2006.01) |
| *B01D 53/73* | (2006.01) |

(52) U.S. Cl.
CPC . *C04B 5/06* (2013.01); *Y02C 10/04* (2013.01); *B01D 53/73* (2013.01); *B01D 2251/402* (2013.01); *B01D 53/1493* (2013.01); *B01D 2252/10* (2013.01); *B01D 2251/306* (2013.01); *B01D 53/62* (2013.01); *C22B 7/04* (2013.01); *B01D 2251/304* (2013.01); *C01B 31/24* (2013.01); *B01D 2251/602* (2013.01); *C01F 11/181* (2013.01); *B01D 2257/504* (2013.01); *B01D 2251/404* (2013.01); *C21B 3/06* (2013.01)

USPC .......................................... 423/230; 423/220

(58) Field of Classification Search
CPC ............ C22B 3/22; C22B 3/44; B01D 53/62; B01D 53/78; B01D 53/79; B01D 53/80; B01D 53/1418; B01D 53/1475; B01D 2257/504; Y02C 10/06; C09C 1/02
USPC .......................... 423/220, 230, 430, 431, 432
See application file for complete search history.

(56) References Cited

U.S. PATENT DOCUMENTS

| | | | |
|---|---|---|---|
| 7,722,842 B2 | 5/2010 | Park et al. | |
| 2005/0002847 A1* | 1/2005 | Maroto-Valer et al. | ....... 423/432 |

(Continued)

FOREIGN PATENT DOCUMENTS

| | | |
|---|---|---|
| JP | 2005097072 A | 4/2005 |
| JP | 2006150232 A | 6/2006 |

(Continued)

OTHER PUBLICATIONS

"Slag (metallurgy)." Brittanica Online Encyclopedia (2014). Viewed Jan. 29, 2014 at http://www.britannica.com/EBchecked/topic/548015/slag.*

*Primary Examiner* — Stanley Silverman
*Assistant Examiner* — Daniel Berns
(74) *Attorney, Agent, or Firm* — Edwards Wildman Palmer LLP; Peter F. Corless

(57) ABSTRACT

A method and system of fixing carbon dioxide is provided. After metal ion components are extracted from, e.g., natural mineral or steel slag through acid treatment, carbon dioxide is injected to fix carbon dioxide by carbonating the same. Since the procedure of pH adjustment is unnecessary, the reaction is carried out effectively and a continuous process is enabled. Accordingly, the disclosed method of fixing carbon dioxide enables effective removal of carbon dioxide produced from the steelmaking industry, thereby significantly reducing greenhouse gas emission and allowing recycling of the discarded steel slag.

10 Claims, 2 Drawing Sheets

(56) References Cited

U.S. PATENT DOCUMENTS

| | | | |
|---|---|---|---|
| 2005/0180910 A1* | 8/2005 | Park et al. | 423/432 |
| 2010/0092368 A1* | 4/2010 | Neumann et al. | 423/437.1 |
| 2012/0128553 A1* | 5/2012 | Chung et al. | 423/1 |

FOREIGN PATENT DOCUMENTS

| | | | |
|---|---|---|---|
| KR | 10-0891551 | | 3/2009 |
| KR | 10-2009-0126129 | | 12/2009 |
| WO | WO 2009/039393 | * | 3/2009 |

* cited by examiner

METHOD OF FIXING CARBON DIOXIDE

CROSS-REFERENCE TO RELATED APPLICATIONS

This application claims priority under 35 U.S.C. §119 to Korean Patent Application No. 10-2010-0120925, filed on Nov. 30, 2010, in the Korean Intellectual Property Office, the disclosure of which is incorporated herein by reference in its entirety.

BACKGROUND (a) Technical Field

The present invention relates to a method and system of fixing carbon dioxide. More particularly, the disclosure relates to a method for fixing carbon dioxide utilizing natural mineral or steel slag produced from ironworks, thereby reducing emission of carbon dioxide into the atmosphere.

(b) Background Art

Carbon dioxide emission is increasing rapidly due to the increased fossil fuel consumption and is recognized as the main cause of global warming. Thus, many countries in the world have been making efforts and tightening regulations to reduce carbon dioxide emissions.

The reduction in carbon dioxide emissions can be mediated by reducing the use of fossil fuel itself or by a method which separates, collects and fixes the carbon dioxide produced thereof. For the latter, utilization of the separated and collected carbon dioxide as a source for methanol synthesis, or fixing the separated and collected carbon dioxide by dumping it into the ocean or using carbonate minerals have been studied in the past.

For example, one method fixes carbon dioxide using carbonate minerals. In this method, alkaline substances (CaO, MgO, $K_2O$, $Na_2O$, etc.) existing in minerals are reacted with carbon dioxide to produce carbonates ($CaCO_3$, $MgCO_3$, $Na_2CO_3$, $K_2CO_3$, etc.) to fix the carbon dioxide emitted from plants.

Slags produced from the steelmaking process include molten iron pretreatment slag, converter slag, stainless steel slag, electric furnace slag, or the like. These steel slags are mostly buried, except for limited utilization as cement or aggregates for road or building construction. Various methods for utilizing the discarded steel slag have been proposed, as it becomes difficult to find landfills for disposal.

Korean Patent Application Publication No. 2002-0050429, entitled "Pretreatment Method Of Steel Slag By Using Carbon Dioxide," proposes a method of fixing carbon dioxide on the surface of steel slag for use in harbor construction or artificial fish banks for fish. In another attempt to dispose of carbon dioxide using slag, Korean Patent Application Publication No. 2006-0023206 entitled, "A Method for Fixing of Carbon Dioxide," proposes fixing carbon dioxide on the surface of slag containing a certain level of water by reacting it with carbon dioxide. However, the methods described in the above two patents require too long a reaction time since the efficiency of the reaction between carbon dioxide and slag is very low and, thus, are economically impractical.

Korean Patent No. 0891551 (Application No. 2008-0025573), entitled "Solidification Method Of Carbon Dioxide By Mineral Carbonation Of Slag Generated In An Iron Industry, Capable Of Improving Reaction Efficiency," proposes a method of solidifying carbon dioxide by carbonating alkaline components extracted from steel slag with gaseous carbon dioxide through a pressurized hydrothermal reaction or a normal-pressure hydrothermal reaction. However, the hydrothermal reaction consumes a lot of energy, and there is no clear description about how the carbon dioxide is fixed following the carbonation of the alkaline components.

Korean Patent No. 0801542 (Application No. 2006-0105753) entitled, "Method For Converting Talc For Mineral Carbonation By Removing Water Molecules And Hydroxyl Groups, And A Method For Mineral Carbonation Of Carbon Dioxide Using Talc Obtained Thereby," proposes a method of fixing carbon dioxide using the natural mineral talc. However, since it requires a particle size of 125 μm or smaller, excessive energy is consumed for the pulverization of the mineral. Further, after the alkaline components are treated with a weakly acid solvent such as acetic acid for extraction, when pH is increased to fix the carbon dioxide through carbonation, some metal ions (e.g., $Ca^{2+}$) react with hydroxide ions (OH) to form milky lime ($Ca(OH)_2$), resulting in suspension. Thus, an additional precipitation or filtration procedure is required. Since the precipitated carbonate suspends in the solution, the separation is difficult and it is not easy to establish an industrially applicable continuous process.

SUMMARY

The present invention relates to a method capable of overcoming the problems present in the conventional methods, effectively fixing carbon dioxide and being applicable to actual processes, whereby carbon dioxide can be fixed via a liquid-phase reaction, and provide improved reaction efficiency, at a normal temperature under normal pressure, thus reducing energy consumption. Additionally, in the present invention, the procedure of pH adjustment for carbon dioxide fixation is unnecessary, thus preventing the formation of suspending milky lime and allowing a continuous process.

In one embodiment of the present invention, a method of fixing carbon dioxide includes (a) treating natural mineral or steel slag with an acid to extract metal ion components; (b) injecting carbon dioxide to an extraction solution containing the metal ion components obtained in step (a) to carbonate the same; (c) transferring a solution in which carbonates resulting from step (b) are dissolved to a dissolved carbonate storage tank and storing the same; and (d) transferring the stored dissolved carbonates to a carbonate separation/purification tank and adjusting pH to about 7 or above to separate the carbonates.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the disclosure, and wherein.

Figure 1:
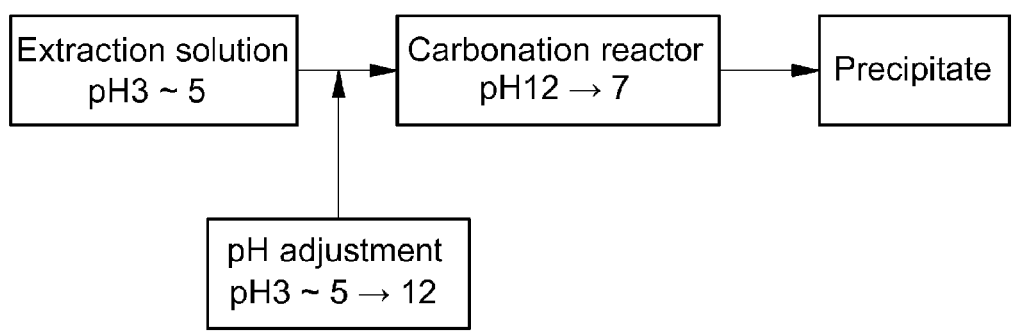
FIG. 1 shows an existing process of fixing carbon dioxide using slag.
Figure 2:
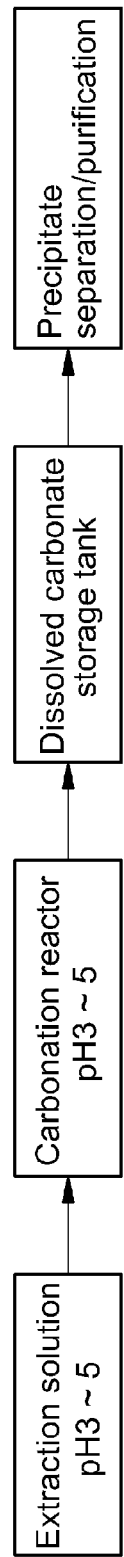
FIG. 2 shows a method of fixing carbon dioxide using natural mineral or steel slag according to an exemplary embodiment of the present invention.

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention provides a method of fixing carbon dioxide which (a) treats natural mineral or steel slag with an acid to extract metal ion components; (b) injects carbon dioxide into an extraction solution containing the metal ion components obtained in step (a) to carbonate the same; (c) transfers a solution in which carbonates resulting from step (b) are dissolved to a dissolved carbonate storage tank and storing the same; and (d) transfers the stored dissolved carbonates to a carbonate separation/purification tank and adjusts the pH to about 7 or above to separate the carbonates.

In step (a), the natural mineral is not particularly limited. For example, peridotite, basalt, talc, serpentinite, wollastonite, etc. containing a large amount of calcium oxide and magnesium oxide may be used. The contents of calcium oxide and magnesium oxide in serpentinite and wollastonite among them are shown as an example in Table 1.

And, in step (a), the steel slag may be slag, electric furnace slag or converter slag produced, e.g., from the ironworks during blast furnace, converter or oxygen blowing processes. The steel slag is mostly utilized as cement or aggregates for road or building construction. The chemical composition of various steel slags is also shown in Table 1.

TABLE 1

|  |  | CaO (wt %) | MgO (wt %) |
|---|---|---|---|
| Natural mineral | Serpentinite | 0 | 40 |
|  | Wollastonite | 48 | 0 |
| Steel slag | Blast furnace slag | 41 | 10 |
|  | Converter slag | 46 | 2 |
|  | Electric furnace slag | 20 | 5 |
|  | Ladle furnace slag | 54 | 10 |

Since the natural mineral and the steel slag contain a large amount of metal oxides including calcium oxide and magnesium oxide, they exhibit high basicity and, upon acid treatment, the metal components of the metal oxides are released to the solution, thus exhibiting alkaline properties. The metal ion components are mostly $Ca^{2+}$ and $Mg^{2+}$, and the remainder may be $K^+$, $Na^+$, etc.

Specifically, the acid treatment may be performed at pH 3-5. For this, an acidic substance such as acetic acid, sodium acetate, hydrochloric acid, etc. may be used at adequate concentration. Thus, upon the acid treatment, the solution containing the metal ions, e.g., $Ca^{2+}$, $Mg^{2+}$, etc., has an acidic pH.

According to the existing method, the pH of the extraction solution is adjusted to about 12 and then carbon dioxide is injected to form carbonate precipitate, for fixing by carbonation. During this procedure, some of the dissolved metal ions (e.g., $Ca^{2+}$, $Mg^{2+}$, etc.) react with hydroxide ions ($OH^-$) to form milky lime, thus resulting in suspension. Unless the suspending solid is effectively separated, it becomes difficult to fix carbon dioxide through a continuous process. As a result, treatment of carbon dioxide in large scale is impossible.

To resolve the limitation of the existing method, the present invention omits the procedure of adjusting the pH to about 12. By omitting the pH adjustment procedure, the formation of milky lime and consequently the formation of suspending solids can be prevented. Thus, a continuous process is enabled and treatment of carbon dioxide in large scale is possible. According to the present invention, the procedure of adjusting pH to a predetermined alkaline range (e.g., pH 7 or above) for separation of the carbonates is assigned after a CO2 reaction with metal ion components is completed. Since the metal ions have participated in reactions to form the carbonates, the possibility of forming suspending solids through reaction with hydroxide ions is very low. The solution in which the carbonates resulting from the carbon dioxide fixing (step (b)) are dissolved are transferred to a dissolved carbonate storage tank and stored there. Then, after the stored dissolved carbonates are transferred to a carbonate separation/purification tank, the pH is adjusted to 7 or above to separate the carbonates. Consequently, the procedures of carbonation and carbonate separation can be performed continuously.

In the present invention, the carbonation in step (b) may be performed at normal temperature under normal pressure. Here, the normal temperature and the normal pressure mean that no additional heat or pressure needs to be applied. For example, the temperature may be between about 0-40° C. (32-104° F.), and preferably between about 10-25° C. (50-77° F.), and the pressure may be between about 0.1-5 atm, and preferably between about 0.5-2 atm. In accordance with the present invention, the carbonation can be completed within about 5 minutes even without the energy-consuming hydrothermal reaction. That is to say, the carbonation reaction of step (b) can be completed within about 5 minutes when the injection rate of carbon dioxide is, e.g., 2 L/min. Since the release of the metal ion components in step (a) can be accomplished within about 2 hours, the overall process can be completed in about 2 hours, making it a very economical process. Thus, carbon dioxide can be effectively fixed using natural mineral or steel slag, for example, slag, electric furnace slag or converter slag produced from the ironworks during blast furnace, converter or oxygen blowing processes, thereby remarkably reducing the emission of the greenhouse gas and allowing the utilization of the previously discarded steel slag.

The carbon dioxide gas treated by the method according to the present invention may be any carbon dioxide gas, including those produced as a by-product of industrial furnaces such as blast furnace, lime burning furnace, coking furnace, etc., sintering or hot-rolling processes, power generation, waste heat boilers, or the like. Accordingly, if a facility capable of fixing carbon dioxide generated in the steelmaking process is equipped at the ironworks, the steel slag produced during the process may be utilized to fix the global warming-causing gas on site. Through this, the environmental regulation can be met and the by-products such as metal oxides can be utilized as a new source of revenue, rather than wastes.

EXAMPLE

The example and experiment will now be described. The following example and experiment are for illustrative purposes only and not intended to limit the scope of this disclosure.

Example

Metal ion components were extracted from steel slag with a particle size of 1-5 mm using 10 vol % acetic acid at pH 3-5.

The weight ratio of the extraction solvent to the slag was 10:1, and stirring rate was 150 rpm. Change in calcium ion concentration with extraction time is shown in Table 2.

TABLE 2

| Extraction time (hr) | 1 | 2 | 3 |
|---|---|---|---|
| Calcium ion concentration (mg/L) | 26,000 | 38,000 | 38,000 |

As seen from Table 2, the extraction of the metal ions by the acid treatment was completed in about 2 hours.

Carbonation (carbon dioxide fixing) was carried out by injecting carbon dioxide to the resulting extraction solution. Carbonation was performed at 25° C. (77° F.) and 1 atm with the flow rate of carbon dioxide maintained at 2 L/min. Change in calcium ion concentration and pH with carbonation time is shown in Table 3.

TABLE 3

| Carbonation time (min) | 1 | 1.5 | 2 | 2.5 | 3 | 3.5 | 4 | 4.5 |
|---|---|---|---|---|---|---|---|---|
| Calcium ion concentration (mg/L) | 38,000 | 22,000 | 18,000 | 16,000 | 13,500 | 13,200 | 13,000 | 13,000 |
| pH | | 3.71 | 3.90 | 3.98 | 4.02 | 4.06 | 4.10 | 4.14 | 4.22 |

As seen from Table 3, carbonation was completed within about 4.5 minutes following the injection of carbon dioxide.

Conversion ratio of calcium ions and purity of precipitating calcium carbonate are summarized in Table 4.

TABLE 4

| Calcium ion concentration (mg/L) | | Conversion ratio | Purity of precipitating |
|---|---|---|---|
| Before carbonation (A) | After carbonation (B) | of dissolved calcium carbonate ((A − B)/A × 100, %) | calcium carbonate (%) |
| 38,000 | 13,000 | 65.8 | 99 |

As seen from Table 4, both the purity and yield of precipitating calcium carbonate could be improved. Thus, the method proposed in the present invention whereby carbon dioxide is fixed by carbonation without pH adjustment, enables preparation of high-purity carbonate in about 2 hours. Further, since a continuous process is enabled, treatment of carbon dioxide in large scale is possible.

Advantageously, the method of fixing carbon dioxide according to the present invention, whereby metal ions are extracted through acid treatment of natural mineral or steel slag, is much more effective than the existing solid-gas reaction. Since the reaction is carried out at normal temperature under normal pressure without requiring an energy-intensive procedure such as hydrothermal synthesis, energy consumption can be reduced. Further, since the pH adjustment for fixing carbon dioxide is omitted, formation of suspending milky lime can be prevented and a continuous process is enabled.

Furthermore, since the method of fixing carbon dioxide according to the present invention allows reduction of carbon dioxide emission using steel slag which is currently used only for valueless applications, it can be an effective measure to cope with the greenhouse gas reduction requirement imposed on steelmaking companies while allowing recycling of the discarded steel slag as carbonate.

The illustrative embodiment of the present invention may also be embodied as a system for fixing carbon dioxide. In the system, a first device may be configured to treat slag with an acid to extract metal ion components. An extraction solution containing the extracted metal ion components may be injected with carbon dioxide by a second device, e.g., an injector, to carbonate the extraction solution. A solution in which the carbonates resulting from the injection of carbon dioxide are dissolved may then be transferred to and received by a first tank which is configured to store the resulting carbonates. The stored dissolved carbonates are then transferred to and received by a second storage tank which is configured to adjust the pH of the carbonates to a predetermined range (e.g., 7 or above) to separate the carbonates.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A method of fixing carbon dioxide comprising:
    (a) treating natural mineral or steel slag with an acid to extract metal ion components;
    (b) injecting carbon dioxide into an extraction solution containing the extracted metal ion components in (a) to carbonate the same;
    (c) transferring a solution in which the resulting carbonates in (b) are dissolved to a dissolved carbonate storage tank and storing the same; and
    (d) transferring the stored dissolved carbonates to a carbonate separation/purification tank and adjusting pH to 7 or above to separate the carbonates,
    wherein said carbonating is performed at a carbon dioxide injection rate of 2 L/min and is completed within 5 minutes.

2. The method of fixing carbon dioxide according to claim 1, wherein said treating with the acid is performed at pH 3-5.

3. The method of fixing carbon dioxide according to claim 1, wherein said carbonating is performed at normal temperature under normal pressure.

4. The method of fixing carbon dioxide according to claim 1, wherein the steel slag is one of a group consisting of slag, electric furnace slag or converter slag produced from the ironworks during blast furnace, converter or oxygen blowing processes.

5. A method of fixing carbon dioxide comprising:
    (a) treating slag with an acid to extract metal ion components;
    (b) injecting carbon dioxide into an extraction solution containing the extracted metal ion components in (a) to carbonate the same;
    (c) transferring a solution in which the resulting carbonates in (b) are dissolved to a first tank and storing the resulting carbonates in the first tank; and (d) transferring the stored dissolved carbonates to a carbonate second tank and adjusting pH to a predetermined range to separate the carbonates,
wherein said carbonating is performed at a carbon dioxide injection rate of 2 L/min and is completed within 5 minutes.

6. The method of fixing carbon dioxide according to claim 5, wherein said treating with the acid is performed at pH 3-5.

7. The method of fixing carbon dioxide according to claim 5, wherein said carbonating is performed at a temperature between 0-40° C. and the pressure is between 0.1-5 atm.

8. The method of fixing carbon dioxide according to claim 5, wherein said carbonating is performed at a temperature between 10-25° C. and the pressure is between 0.1-2 atm.

9. The method of fixing carbon dioxide according to claim 5 wherein slag is steel slag and the steel slag is one of a group consisting of electric furnace slag or converter slag produced from the ironworks during blast furnace, converter or oxygen blowing processes.

10. The method of fixing carbon dioxide according to claim 5 wherein the adjusted predetermined range for the pH is 7 or above.

* * * * *